United States Patent
Meyer

(10) Patent No.: US 9,908,302 B2
(45) Date of Patent: Mar. 6, 2018

(54) METHOD FOR ADHERING AN INNERLINER TO A CARCASS PLY OF A TIRE

(75) Inventor: Bruce Meyer, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 144 days.

(21) Appl. No.: 14/406,789

(22) PCT Filed: Jun. 21, 2012

(86) PCT No.: PCT/US2012/043456
§ 371 (c)(1),
(2), (4) Date: Dec. 10, 2014

(87) PCT Pub. No.: WO2013/191692
PCT Pub. Date: Dec. 27, 2013

(65) Prior Publication Data
US 2015/0165707 A1    Jun. 18, 2015

(51) Int. Cl.
*B29D 30/36* (2006.01)
*B29D 30/20* (2006.01)
(Continued)

(52) U.S. Cl.
CPC .............. *B29D 30/36* (2013.01); *B29D 30/16* (2013.01); *B29D 30/18* (2013.01); *B29D 30/20* (2013.01);
(Continued)

(58) Field of Classification Search
CPC  B29D 30/36; B29D 2030/3071; B29D 30/20; B60C 17/0009
See application file for complete search history.

(56) References Cited

U.S. PATENT DOCUMENTS

| | | | | | |
|---|---|---|---|---|---|
| 2,409,974 | A | * | 10/1946 | Breth | B29D 30/248 156/132 |
| 2,973,799 | A | * | 3/1961 | Kelly | B29D 30/38 112/410 |

(Continued)

FOREIGN PATENT DOCUMENTS

| | | |
|---|---|---|
| EP | 634266 A2 | 1/1995 |
| JP | 5305682 | 11/1993 |

(Continued)

OTHER PUBLICATIONS

Machine generated English language translation of JP 2005-119227 (original document dated May 2005).*

(Continued)

*Primary Examiner* — Martin K Rogers
(74) *Attorney, Agent, or Firm* — Dority & Manning, P.A.

(57) ABSTRACT

A method of assembling a tire having one or more reinforcements or supporting inserts in the sidewalls is provided. The reinforcements are positioned onto one or more air impermeable layers. One or more reinforcing plies are positioned over the reinforcing supports and suspended therebetween. A gas pressure is used to expand the one or more air impermeable layers away from the forming drum and against a reinforcing ply. As such, the creases or wrinkles in the one or more reinforcing plies can be avoided along with other non-uniformities such as deradialization and/or an uneven overlap where the ends of a ply are joined.

17 Claims, 6 Drawing Sheets

(51) Int. Cl.
  *B29D 30/16* (2006.01)
  *B29D 30/18* (2006.01)
  *B29D 30/28* (2006.01)
  B29D 30/06 (2006.01)
  B29D 30/30 (2006.01)

(52) U.S. Cl.
  CPC ...... *B29D 30/28* (2013.01); *B29D 2030/0682* (2013.01); *B29D 2030/201* (2013.01); *B29D 2030/3071* (2013.01)

(56) References Cited

U.S. PATENT DOCUMENTS

| | | | | |
|---|---|---|---|---|
| 3,722,567 | A * | 3/1973 | Delobelle | B29D 30/20 152/455 |
| 4,226,655 | A * | 10/1980 | Bush | B29D 30/20 152/543 |
| 4,229,246 | A * | 10/1980 | Vanderzee | B29D 30/32 156/132 |
| 4,402,783 | A * | 9/1983 | Enders | B29D 30/245 156/415 |
| 5,490,897 | A * | 2/1996 | Miyanaga | B29D 30/245 156/415 |
| 6,488,797 | B1 * | 12/2002 | Kirby | B29D 30/246 152/517 |
| 6,536,493 | B2 | 3/2003 | Beck, Jr. et al. | |
| 7,144,467 | B2 | 12/2006 | Reding et al. | |
| 7,241,353 | B2 | 7/2007 | Tokunaga | |
| 7,670,449 | B2 | 3/2010 | Downing et al. | |
| 7,837,816 | B2 | 11/2010 | Linne et al. | |
| 8,785,028 | B1 * | 7/2014 | Saiki | H01M 2/22 429/121 |
| 2005/0000624 | A1 | 1/2005 | Tokunaga | |
| 2005/0028920 | A1 | 2/2005 | Roedseth | |
| 2005/0061412 | A1 * | 3/2005 | Noto | B29D 30/0681 152/510 |
| 2007/0284029 | A1 * | 12/2007 | Lacagnina | B29D 30/20 156/132 |
| 2007/0289694 | A1 * | 12/2007 | Macheffe | B29D 30/28 156/133 |
| 2008/0149250 | A1 | 6/2008 | Trares | |
| 2009/0084483 | A1 * | 4/2009 | Majumdar | B29D 30/0685 152/504 |
| 2009/0159172 | A1 * | 6/2009 | Tanno | B29D 30/0061 152/548 |
| 2010/0024986 | A1 * | 2/2010 | Tatara | B29D 30/0061 156/397 |
| 2010/0147439 | A1 | 6/2010 | Koeune | |
| 2011/0072664 | A1 * | 3/2011 | Marchini | B29D 30/244 29/894.3 |
| 2011/0108187 | A1 * | 5/2011 | Gianni | B29D 30/20 156/133 |

FOREIGN PATENT DOCUMENTS

| | | | | |
|---|---|---|---|---|
| JP | 2005-119227 | * | 5/2005 | ............ B29D 30/24 |
| JP | 2005-238654 | * | 9/2005 | ............ B29D 30/30 |
| WO | WO 2001/085475 | | 11/2001 | |

OTHER PUBLICATIONS

PCT International Search Report for PCT/US2012/043456, dated Sep. 7, 2012.

European Search Report for PCT/US2012041456, dated Feb. 25, 2016, 5 pages.

* cited by examiner

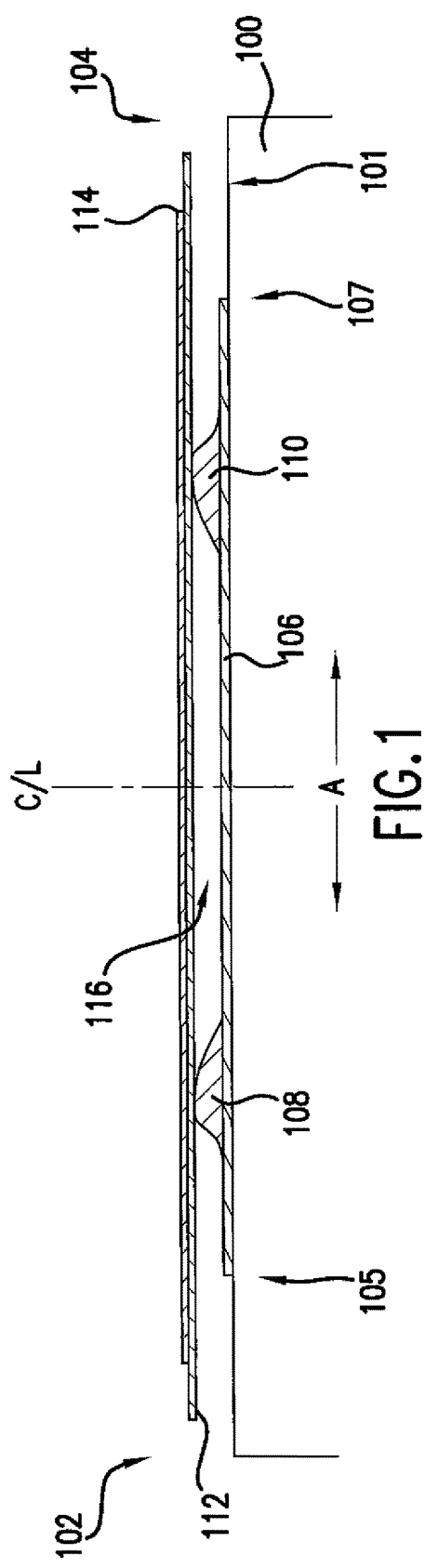
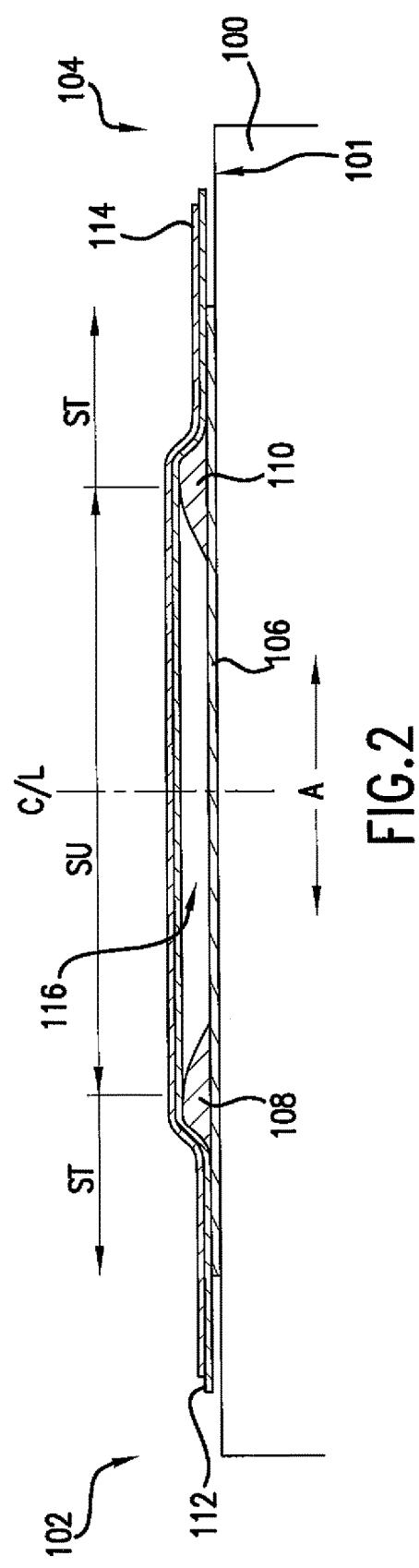

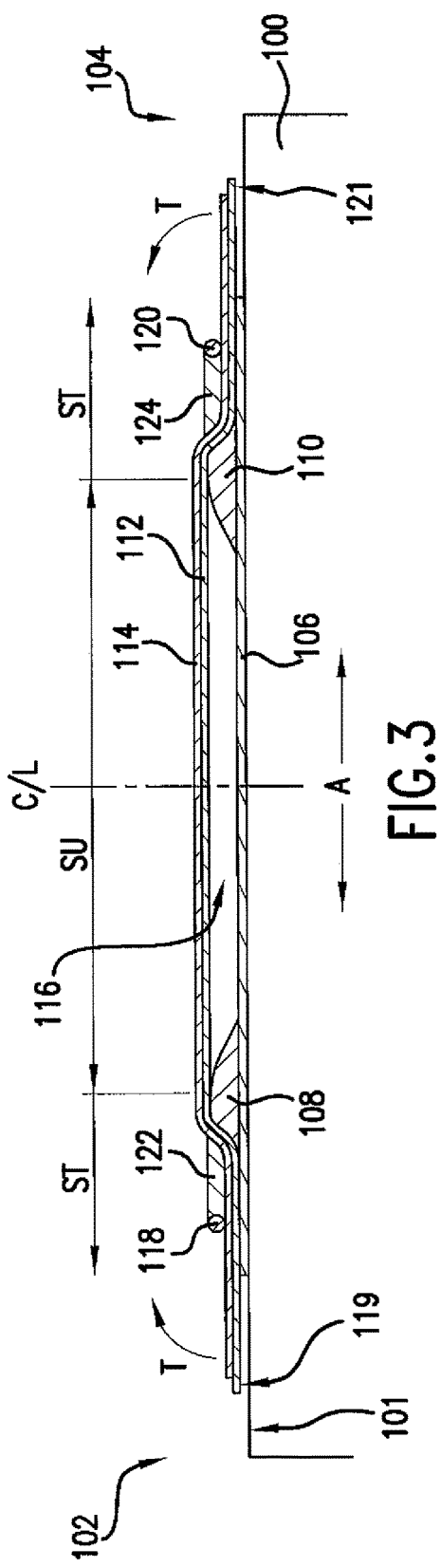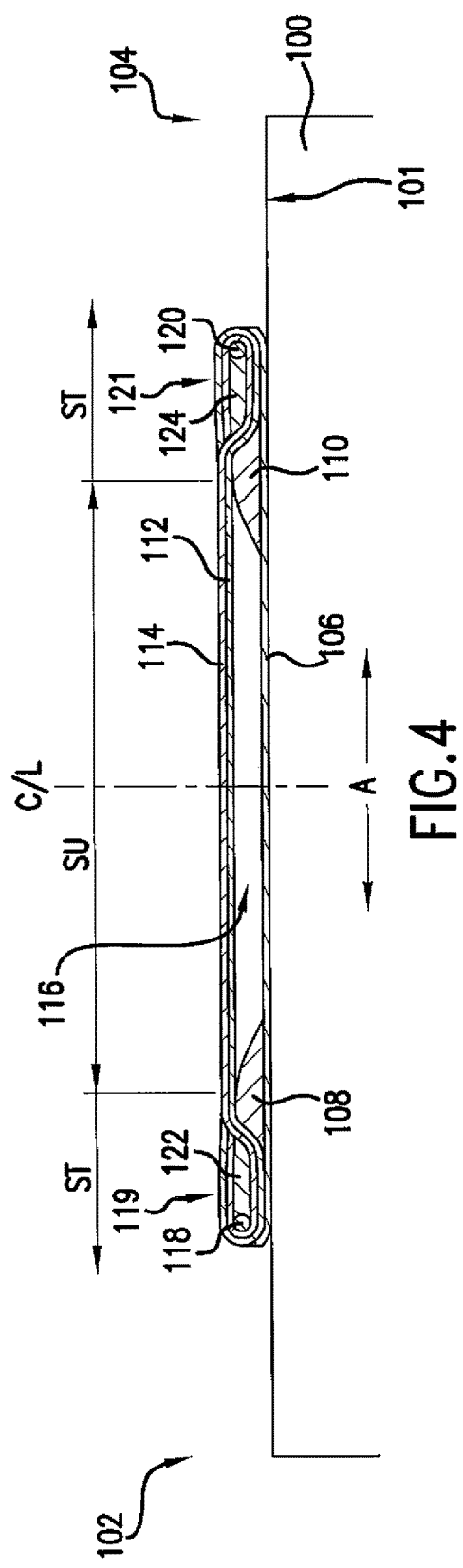

METHOD FOR ADHERING AN INNERLINER TO A CARCASS PLY OF A TIRE

FIELD OF THE INVENTION

The subject matter of the present disclosure relates generally to method of adhering the inner liner of a tire to a reinforcing ply.

BACKGROUND OF THE INVENTION

Tires are commonly manufactured using of one or more building drums upon which the tire is constructed from multiple layers and components that are placed sequentially onto the drum. For example, in one technique, a layer of air impermeable rubber is laid onto the forming surface of a cylindrical drum. One or more carcass plies are placed onto the drum. A pair of circular beads are placed on opposing sides and may include bead wires and bead fillers. The plies are turned up and the beads are moved towards each other to create a toroidal shape. A sidewall protective rubber and a tread portion are added.

The addition of rubber elements into the sidewalls of the tire can be desirable for certain tire applications. For example, the addition of rubber reinforcements into the sidewalls can be used along with other features to provide a tire that is capable of operating for a limited distance after losing inflation pressure. Such may allow the driver to reach a service center or other location more suitable than where the pressure loss occurred.

Certain challenges, however, are presented in the manufacture of tires having e.g., reinforcement in the sidewalls. The forming drum is typically a cylindrical shape having a flat profile along the axial direction but may have recesses for accepting features such as circular beads. For designs where these reinforcements are presented onto the forming drum before a carcass ply or reinforcing ply is laid onto the forming drum, the reinforcements create a profile that is no longer flat along the axial direction of the drum. Presentation of a carcass ply onto this uneven profile can result in undesirable creases or wrinkles—particularly when attempting to press the carcass ply towards the forming drum to make contact with e.g., an air impermeable layer on the forming drum. In turn, these creases can lead to an undesirable orientation and positioning of cords and/or other reinforcing elements present in the reinforcing ply—referred to herein as deradialization. Also, the joining of the ends of the ply may no longer be uniform as the amount of overlap may be quite variable.

Accordingly, a method for assembling a tire having one or more reinforcements or supports in the sidewalls would be useful. More particularly, such a method that can be used to reduce or avoid creases or wrinkles that can lead to deradialization and/or non-uniformities in the joining of the ends of the plies would be beneficial.

SUMMARY OF THE INVENTION

The present invention provides a method of assembling a tire having one or more reinforcements or supporting inserts in the sidewalls. The reinforcements are positioned onto one or more air impermeable layers. One or more reinforcing plies are positioned over the reinforcing supports and suspended therebetween. A gas pressure is used to expand the one or more air impermeable layers away from the forming drum and against a reinforcing ply. As such, the creases or wrinkles in the one or more reinforcing plies can be avoided along with other non-uniformities such as deradialization and/or an uneven overlap where the ends of a ply are joined. Additional objects and advantages of the invention will be set forth in part in the following description, or may be apparent from the description, or may be learned through practice of the invention.

In one exemplary aspect, the present invention provides a method of assembling tire components on a tire building drum having a cylindrically-shaped forming surface extending between opposing sides of the drum. The drum defines axial and circumferential directions. The method comprises the steps of laying one or more air impermeable layers onto the forming surface; positioning a pair of sidewall support inserts onto the one or more air impermeable layers with each sidewall support insert spaced from a respective side of the drum; placing at least one reinforcing ply over the pair of sidewall support inserts on the drum so as to suspend over the forming surface the at least on reinforcing ply between the pair of sidewall support inserts, wherein the at least one reinforcing ply comprises a plurality of perforations centrally positioned on the at least one reinforcing ply and spaced apart along a circumferential direction of the drum; stitching the at least one reinforcing ply to the pair of sidewall support inserts and to the one or more air impermeable layers at locations axially outward of each sidewall support while leaving the reinforcing ply suspended between the pair of sidewall support inserts; depositing a pair of bead fillers onto the at least one reinforcing ply with each bead filler spaced from a side of the drum; locating a pair of circular bead elements onto the drum with each bead element positioned onto the at least one carcass ply; turning up edges of the at least one reinforcing ply over the pair of bead fillers and the pair of bead elements; delivering a gas pressure to the surface of the forming drum so as to separate the one or more air impermeable layers from the forming surface at locations between the bead elements; moving the bead elements toward each other along the axial direction of the drum during the step of delivering a gas pressure; and using the gas pressure to push the one or more air impermeable layers against the at least one reinforcing ply.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 1 through 8 illustrate certain steps of an exemplary method of the present invention as may be used for assembling a tire. For FIGS. 1 through 7, each figure shows a cross-sectional view of certain components of an exemplary tire as presented to a tire building or forming drum. FIG. 8 illustrates a perspective view of a building drum onto which certain components of an exemplary tire have been placed.

DETAILED DESCRIPTION

Figure 5:
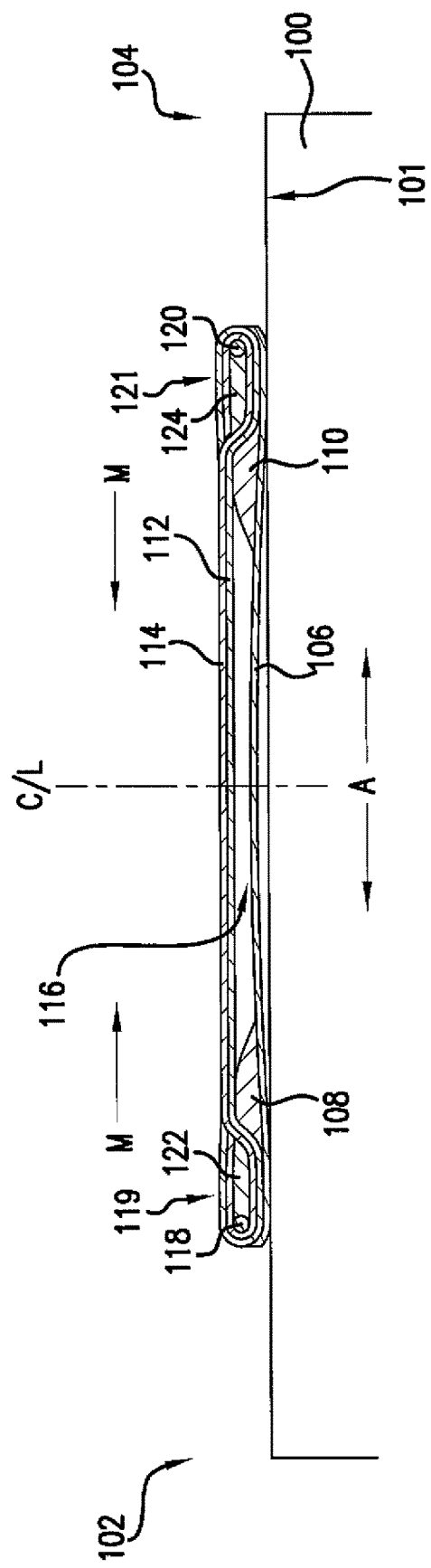

For purposes of describing the invention, reference now will be made in detail to embodiments of the invention, one or more examples of which are illustrated in the drawings.

Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

An exemplary method of the present invention is illustrated through various steps shown in FIGS. 1 through 8 as will now be described. Beginning with FIG. 1, a tire building drum 100 is shown. Drum 100 has a cylindrically-shaped forming surface 101 that extends between opposing sides 102 and 104 and is substantially flat along the axial direction A and curved along circumferential direction C (FIG. 8). Drum 100 is rotatable so as to allow various components to be presented onto the forming surface 101 in the construction of a tire. Drum 100 may include various internal features for positioning components placed onto surface 101.

Initially, an air impermeable layer 106 (also referred to as an "inner liner") is placed onto forming surface 101 in a generally centered position between sides 102 and 104 as shown. While only one layer is illustrated, it should be understood that one or more air impermeable layers may be used. A pair of sidewall support inserts 108 and 110 are positioned onto the air impermeable layer 106. Each insert is placed at a predetermined distance from the sides 102 and 104 of drum 100 in an opposing manner and are generally equally spaced about center line C/L. The shape and size of the inserts is provided by way of example only and other configurations may be used. Additionally, while only a pair of inserts 108 are shown, more than one pair may be used to e.g., increase the sidewall strength of the assembled tire.

A first reinforcing ply 112 and a second reinforcing ply 114 are placed onto the sidewall support inserts 108 and 110. While two plies 112 and 114 are shown in the figures, using the teachings disclosed herein it will be understood that a single reinforcing ply or more than two reinforcing plies may also be used. Additionally, where multiple reinforcing plies are used, such plies do not have to be applied over drum 100 at the same time.

Plies 112 and 114 contain multiple cords and/or other reinforcing features that constrain the assembled tire while making plies 112 and 114 generally stiff and substantially non-expandable. As such, attempts to press plies 112 and 114 into contact with air impermeable layer 106 between inserts 108 and 110 can create creases as previously discussed. Accordingly, for this exemplary method of the present invention, plies 112 and 114 are placed onto sidewall support inserts 108 and 110 and are suspended over the forming surface 101 between the inserts 108 and 110. This creates a temporary cavity 116 extending circumferentially about drum 100 between air impermeable layer 106 and reinforcing ply 112.

Each reinforcing ply includes a plurality of perforations along the circumferential direction. More particularly, as shown in FIG. 8, reinforcing ply 112 includes a plurality of perforations 126 (e.g., holes or openings) that are spaced apart along circumferential direction C. In one exemplary embodiment of the invention, each perforation 126 has a diameter in the range of about 2 mm to about 4 mm. In another exemplary embodiment, each perforation 126 has a diameter of about 3 mm or, for example, 3 mm±0.5 mm.

Additionally, for the exemplary embodiment illustrated, each perforation 126 is centrally positioned on reinforcing ply 112. In other embodiments, perforations 126 should be located in the crown region of the tire. For example, in one exemplary embodiment, perforations 126 are within a range of about 0 to about 10 mm from centerline C/L. In another exemplary embodiment, perforations 126 are positioned on or within ±0.5 mm of centerline C/L. Other placements may be used, provided perforations 126 are located in the crown region of the tire. Similar perforations are provided in reinforcing ply 114. A variety of techniques may be used to create perforations 126 in plies 112 and 114 as will be understood by one of skill in the art. The perforations can be created before plies 112 and 114 are applied or created as plies 112 and 114 are pulled onto drum 100.

It is not necessary for the perforations in the reinforcing plies 112 and 114 to be aligned with each other. Also, while two plies 112 and 114 are shown, other constructions may also be used including a single reinforcing ply or more than two plies 112 and 114. In still another alternative, other components may be added between the application of reinforcing ply 112 and reinforcing ply 114. For example, reinforcing ply 112 may be positioned onto inserts 108 and 110. Other features such as e.g., additional sidewall reinforcement inserts may then be positioned into reinforcing ply 112 at positions axially outward of inserts 108 and 110 followed by the positioning of reinforcing ply 114 over or onto the same.

Referring now to FIG. 2, reinforcing plies 112 and 114 are stitched against inserts 108 and 110 as well as air impermeable layer 106 as shown. More specifically, plies 112 and 114 are pressed towards the forming surface 101 at zones ST—which include inserts 108 and 110 and locations axially outward of inserts 108 and 110 as shown. This stitching leaves a portion of the plies 112 and 114—designated as zone SU in FIG. 2—suspended over layer 106 between the radially outermost portion of inserts 108 and 110 so that cavity 116 remains.

A pair of bead fillers 122 and 124 as well as pair of circular bead elements 118 and 120 are positioned onto reinforcing ply 114 as shown in FIG. 3. The shape and size of bead fillers 122 and 124 are provided by way of example only and other configurations may be used. Additionally, while only a pair of bead fillers 122 and 124 are shown, each filler may be constructed from one or more pieces in alternative embodiments of the invention. Each bead filler 122 and 124 and bead 118 and 120 is positioned axially outward of a respective sidewall support insert 108 and 110, respectively.

Referring now to FIGS. 3 and 4, the ends 119 and 121 of the reinforcing plies 112 and 114 are turned up and over bead fillers 122 and 124 and circular bead elements 118 and 120 as indicated by arrows T. Several mechanisms can be used to turn up ends 119 and 121. By way of example, forming surface 101 can be provided with pneumatically powered segments that can be inflated to lift portions of surface 101 and turn ends 119 and 121 over as shown. Other mechanisms may be used as well.

In FIG. 5, a gas pressure (e.g., air) is delivered to the forming surface 101 of drum 100 so as to separate air impermeable layer 106 from surface 101. For example, small passages may be provided in drum 100 to supply a gas to the forming surface 101. As this gas is pressurized, air impermeable layer 106 will separate from forming surface 101 along the portion between bead elements 118 and 120 as shown. At the same time as this gas pressure is delivered, features associated with drum 100 (not shown) are activated such that bead elements 118 and 120 are moved towards each other or axially inward as shown by arrows M. Such drum features may be activated so as to initiate the movement of bead elements 118 and 120 towards each other at the same time the delivery of the gas pressure is initiated. Alternatively, a predetermined interval of time may be allowed to lapse after initiating delivery of the gas pressure before initiating movement of the bead elements 118 and 120 towards each other using features of drum 100.

Figure 6:
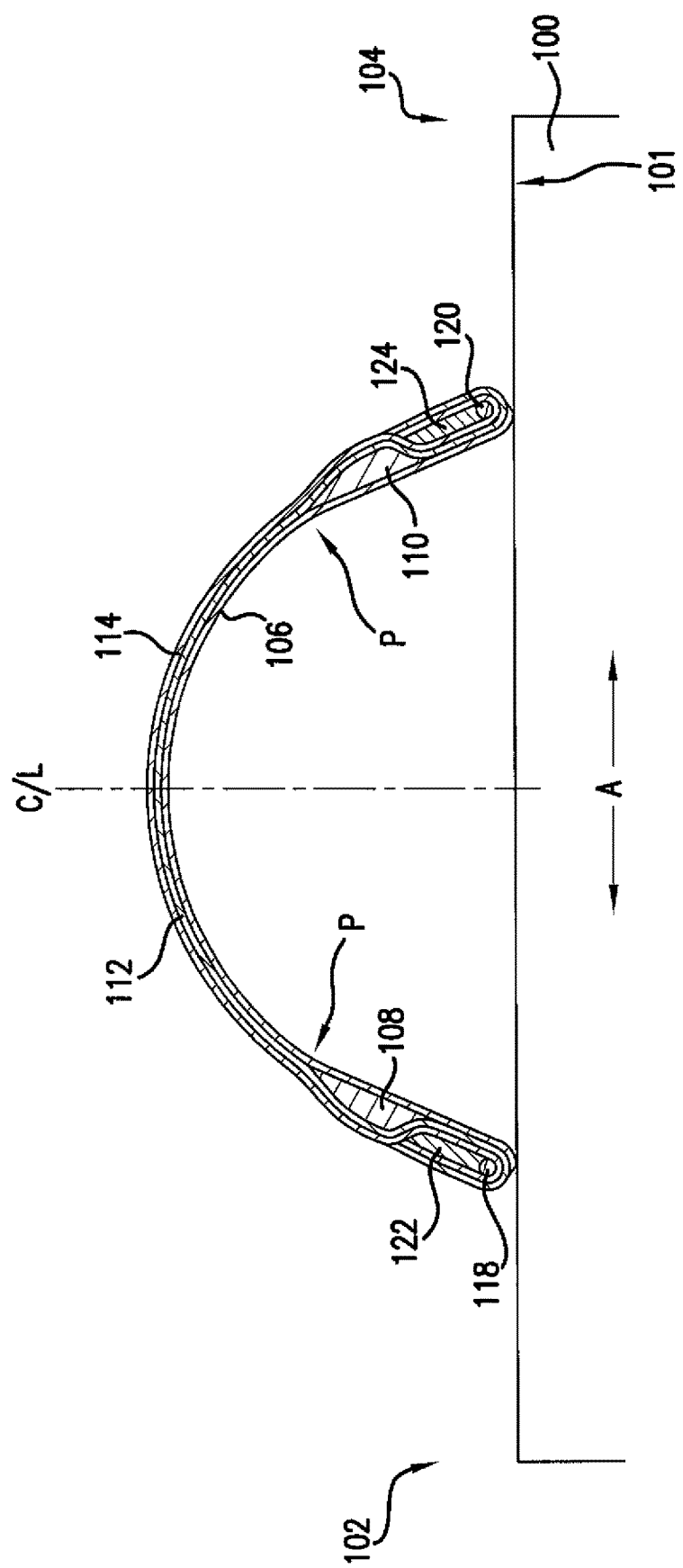

As shown in FIG. 6, while the delivery of the pressurized gas from drum 100 continues, air impermeable layer 106 will eventually contact reinforcing ply 112. The force of gas pressure P against air impermeable layer 106 and the movement of bead elements 118 and 120 (along with bead fillers 122 and 142 and ends 119 and 121) axially inward will cause reinforcing plies 112 and 114 to arch slightly. Plies 112 and 114, anchored by bead elements 118 and 120, will counteract the force provided by air pressure P through gas impermeable layer 106. More particularly, the flexibility of layer 106 allows it to stretch to reach plies 112 and 114. Conversely, the relatively inflexible properties of reinforcing plies 112 and 114 allows air impermeable layer 106 to be forced against and simultaneously supported by plies 112 and 114. In addition, the perforations in plies 112 and 114 allow gas in cavity 116 to escape as air impermeable layer 106 moves towards plies 112 and 114 between e.g., the position shown in FIG. 5 and the position shown in FIG. 6.

Figure 7:
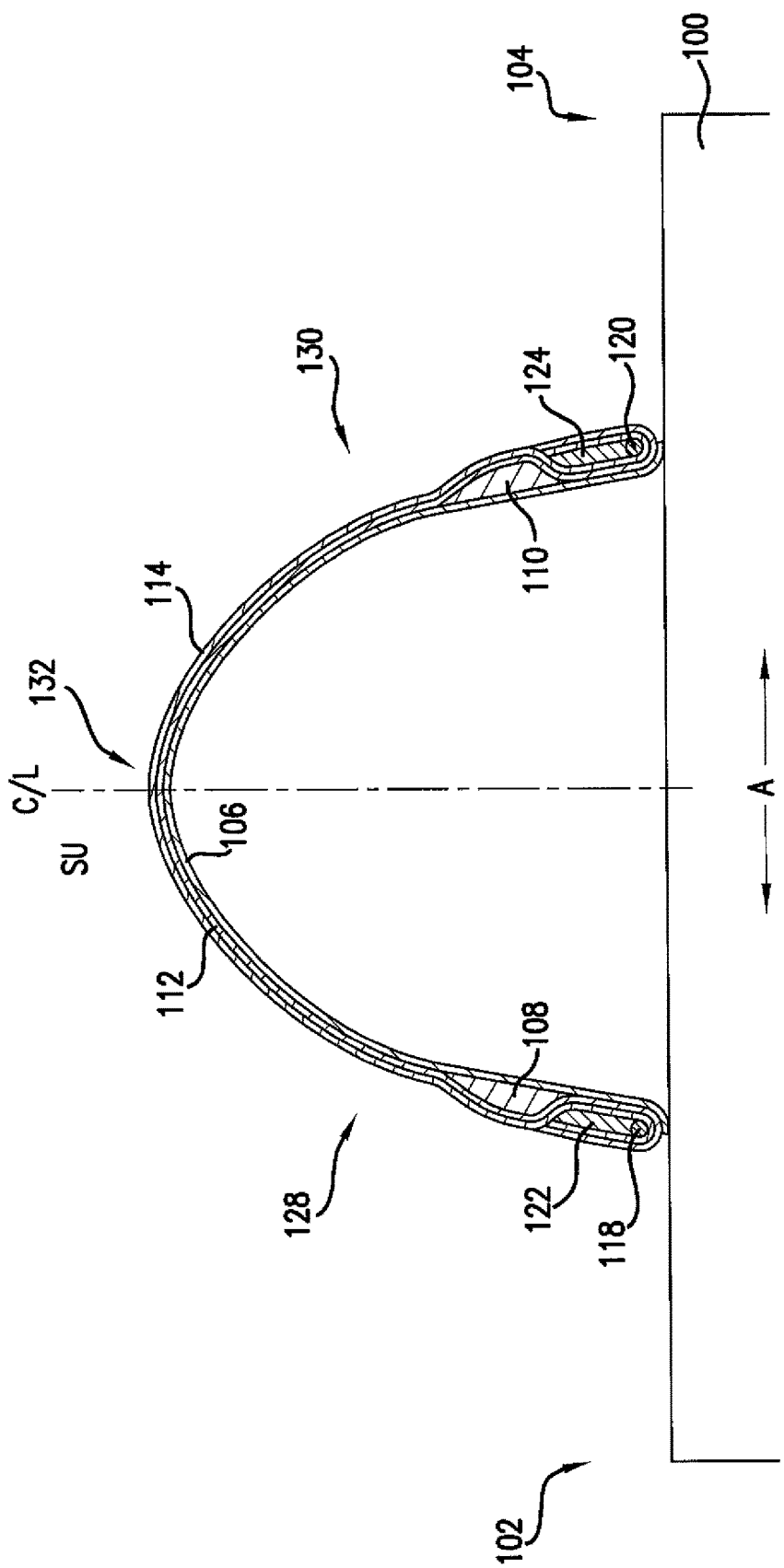
Figure 8:
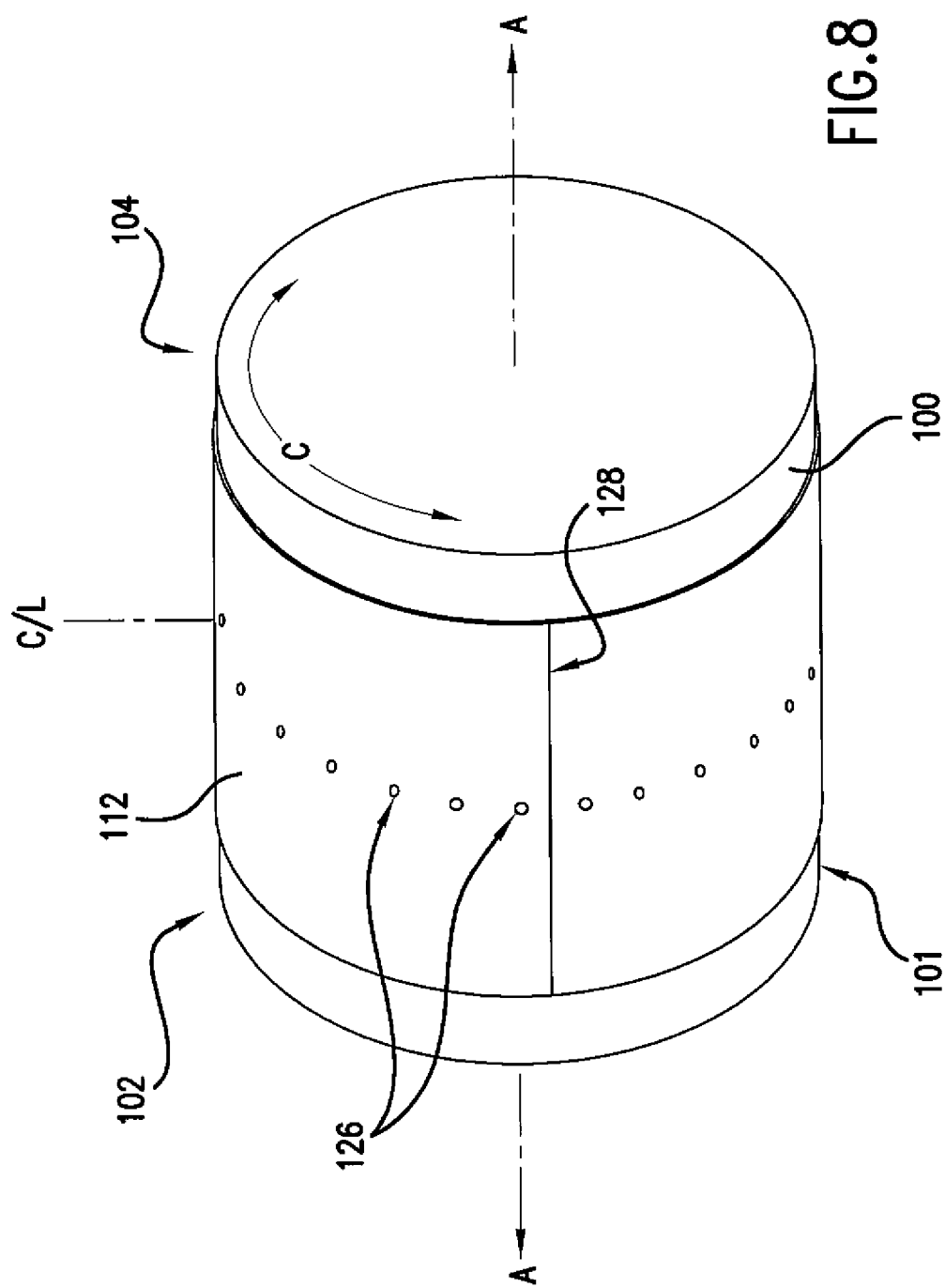

As the air pressure is maintained against air impermeable layer 106 and bead elements 118 and 120 are moved axially inward towards each other, the intermediate tire assembly 130 takes on a toroidal shape as shown in FIG. 7. Protective sidewall rubber members (not shown) can be added to side wall portions 128 and 130. A tread rubber (not shown) can be added to crown portion 132. The resulting intermediate tire assembly 132 can then be removed from forming drum 100 and placed into e.g., a curing press for molding and curing.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method of assembling tire components on a tire building drum having a cylindrically-shaped forming surface extending between opposing sides of the drum, the drum defining axial and circumferential directions and a centerline, the method comprising:

laying one or more air impermeable layers onto the forming surface;

positioning a pair of sidewall support inserts onto the one or more air impermeable layers with each sidewall support insert spaced axially inward toward the centerline a predetermined distance from a respective opposing side of the drum;

placing at least one reinforcing ply over the pair of sidewall support inserts on the drum so as to suspend over the forming surface the at least one reinforcing ply between the pair of sidewall support inserts and create a cavity extending circumferentially around the drum between the at least one reinforcing ply and the one or more air impermeable layers and extending axially from one of the sidewall support inserts to the other sidewall support insert, wherein the at least one reinforcing ply comprises a plurality of perforations centrally positioned on the at least one reinforcing ply between the sidewall support inserts and spaced apart along the circumferential direction of the drum;

stitching the at least one reinforcing ply to the pair of sidewall support inserts and to the one or more air impermeable layers at locations axially outward of each sidewall support insert while leaving the at least one reinforcing ply suspended between the pair of sidewall support inserts;

depositing a pair of bead fillers onto the at least one reinforcing ply with each bead filler spaced from a respective one of the sides of the drum;

locating a pair of circular bead elements onto the drum with each bead element positioned onto the at least one reinforcing ply;

turning up edges of the at least one reinforcing ply over the pair of bead fillers and the pair of bead elements;

delivering a gas pressure to the surface of the forming drum so as to separate the one or more air impermeable layers from the forming surface at locations between the bead elements;

moving the bead elements toward each other along the axial direction of the drum during the delivering a gas pressure to the surface of the forming drum;

using the gas pressure to push the one or more air impermeable layers towards the at least one reinforcing ply; and bringing an air impermeable layer of the one or more air impermeable layers into contact with a reinforcing ply of the least one reinforcing ply between the bead elements during the using the gas pressure to push the one or more air impermeable layers, wherein the drum is cylindrically-shaped such that the forming drum is substantially flat along the axial direction and curved along the circumferential direction such that after the step of laying one or more air impermeable layers, the drum has a substantially rectangular cross section from one axial end of the one or more air impermeable layers to an opposing axial end of the one or more air impermeable layers.

2. The method of assembling tire components as in claim 1, further comprising:

allowing gas located between the at least one air impermeable layer and the at least one reinforcing ply to pass through the perforations in the at least one reinforcing ply during the using the gas pressure to push the one or more air impermeable layers towards the at least one reinforcing ply.

3. The method of assembling tire components as in claim 2, wherein the delivering a gas pressure and the moving the bead elements are initiated simultaneously.

4. The method of assembling tire components as in claim 3, further comprising:

positioning tread rubber over a crown portion of the at least one reinforcing ply.

5. The method of assembling tire components as in claim 3, further comprising:

placing a pair of sidewall rubber members onto sidewall portions of the at least one reinforcing ply.

6. The method of assembling tire components as in claim 1, further comprising:

stretching the one or more air impermeable layers during the using the gas pressure to push the one or more air impermeable layers towards the at least one reinforcing ply.

7. The method of assembling tire components as in claim 1, further comprising:

allowing gas located between the one or more air impermeable layers and the at least one reinforcing ply to pass through the perforations in the at least one reinforcing ply during the delivering a gas pressure.

8. The method of assembling tire components as in claim 1, further comprising creating the plurality of perforations in the at least one reinforcing ply prior to the placing at least one reinforcing ply over the pair of sidewall support inserts on the drum.

9. The method of assembling tire components as in claim 1, wherein the perforations in the at least one reinforcing ply are in the range of 1.5 mm to 4.5 mm in diameter.

10. The method of assembling tire components as in claim 1, wherein the perforations in the at least one reinforcing ply are 3 mm in diameter.

11. The method of assembling tire components as in claim 1, wherein the perforations in the at least one reinforcing ply are positioned within in a range of 0 to about 10 mm from a widthwise center of the at least one reinforcing ply along the axial direction of the drum.

12. The method of assembling tire components as in claim 1, wherein the one or more air impermeable layers comprise two air impermeable layers.

13. The method of assembling tire components as in claim 1, wherein the at least one reinforcing ply comprises comprise two reinforcing plies and wherein each of the plies comprises a plurality of perforations centrally positioned on the two reinforcing plies and spaced apart along the circumferential direction of the drum.

14. The method of assembling tire components as in claim 1, wherein a first reinforcing ply is positioned over the pair of sidewall support inserts during the placing at least one reinforcing ply over the pair of sidewall support inserts on the drum, and further comprising delivering a second reinforcing ply over the pair of sidewall support inserts after the turning up edges of the at least one reinforcing ply over the pair of bead fillers and the pair of bead elements.

15. The method of assembling tire components as in claim 1, wherein the using the gas to push the one or more air impermeable layers removes the cavity.

16. The method of assembling tire components as in claim 1, wherein the drum includes passages for delivering the gas to the forming surface.

17. The method of assembling tire components as in claim 1, wherein the delivering a gas pressure occurs after the stitching of the at least one reinforcing ply to the pair of sidewall support inserts and to the one or more air impermeable layers.

* * * * *